United States Patent
Müller et al.

(10) Patent No.: US 10,466,040 B2
(45) Date of Patent: Nov. 5, 2019

(54) SENSOR DEVICE FOR MEASURING A SURFACE

(71) Applicant: Baumer Electric AG, Frauenfeld (CH)

(72) Inventors: Klaus Friedrich Müller, Heidelberg (DE); Sven Bauer, Kreuzlingen (CH)

(73) Assignee: BAUMER ELECTRIC AG, Frauenfeld (CH)

(*) Notice: Subject to any disclaimer, the term of this patent is extended or adjusted under 35 U.S.C. 154(b) by 26 days.

(21) Appl. No.: 15/604,767

(22) Filed: May 25, 2017

(65) Prior Publication Data

US 2017/0343337 A1 Nov. 30, 2017

(30) Foreign Application Priority Data

May 26, 2016 (EP) .................................. 16171490

(51) Int. Cl.
| | | |
|---|---|---|
| *G01B 11/00* | (2006.01) | |
| *G01S 17/00* | (2006.01) | |
| *G01B 11/24* | (2006.01) | |
| *G01B 11/30* | (2006.01) | |
| *G01M 17/02* | (2006.01) | |
| *G01S 17/08* | (2006.01) | |
| *G01B 11/06* | (2006.01) | |
| *G01B 11/22* | (2006.01) | |

(52) U.S. Cl.
CPC .......... *G01B 11/24* (2013.01); *G01B 11/0608* (2013.01); *G01B 11/22* (2013.01); *G01B 11/303* (2013.01); *G01M 17/027* (2013.01); *G01S 17/08* (2013.01)

(58) Field of Classification Search
None
See application file for complete search history.

(56) References Cited

U.S. PATENT DOCUMENTS 3,375,080 A * 3/1968 Fujii ..................... G01N 30/74
422/70
3,548,849 A * 12/1970 Jahnke ..................... F15C 5/00
137/815

(Continued)

FOREIGN PATENT DOCUMENTS

| DE | 44 45 552 A1 | 6/1995 |
|---|---|---|
| DE | 102 12 382 B4 | 1/2016 |

(Continued)

*Primary Examiner* — Shawn Decenzo
*Assistant Examiner* — Jarreas C Underwood
(74) *Attorney, Agent, or Firm* — McGlew and Tuttle, P.C.

(57) ABSTRACT

A sensor device (100), for measuring a surface (101), includes a lighting device (103) emitting a light beam (105); an optical device (107) splitting the light beam (105) into partial light beams (109, 111), and emitting the first partial light beam (109) toward a first surface area (113) and emitting the second partial light beam (111) toward a second surface area (115). A light sensor (117) is configured to receive a first surface area reflection (109-1) of the first partial light beam (109) and a second surface area reflection (111-1) of the second partial light beam (111). A processor (119) is configured to detect a distance of the first surface area (113) and of the second surface area (115) to the sensor device (100) based on a position of the first partial light beam reflection (109-1) and the second partial light beam reflection (111-1) on the light sensor (117).

13 Claims, 2 Drawing Sheets

(56) References Cited

U.S. PATENT DOCUMENTS

| | | | | |
|---|---|---|---|---|
| 4,341,327 | A * | 7/1982 | Zeitz | B67D 7/08 222/135 |
| 4,374,620 | A * | 2/1983 | Berick | G01N 21/05 356/246 |
| 4,461,477 | A * | 7/1984 | Stewart | A63B 69/0002 434/247 |
| 4,577,863 | A * | 3/1986 | Ito | A63B 69/0002 434/247 |
| 4,937,445 | A * | 6/1990 | Leong | G01B 11/00 250/237 G |
| 5,056,922 | A * | 10/1991 | Cielo | G01B 11/245 356/3.06 |
| 5,073,345 | A * | 12/1991 | Scott | G01N 21/85 356/246 |
| 5,381,225 | A * | 1/1995 | Kohno | G01N 21/94 250/559.48 |
| 5,426,505 | A * | 6/1995 | Geiser | G01N 21/45 356/128 |
| 5,555,090 | A * | 9/1996 | Schmutz | G01B 11/0608 356/601 |
| 5,604,587 | A * | 2/1997 | Che | G01N 21/0303 356/246 |
| 5,833,549 | A * | 11/1998 | Zur | A63B 69/0002 473/199 |
| 6,657,216 | B1 * | 12/2003 | Poris | G01B 11/0608 250/216 |
| 6,688,325 | B2 * | 2/2004 | Hettinger | F15B 13/0814 137/270 |
| 6,825,936 | B2 * | 11/2004 | Metcalfe | G01B 11/04 250/214 R |
| 6,937,332 | B2 * | 8/2005 | Engler | G01N 21/532 356/338 |
| 7,808,641 | B2 * | 10/2010 | Salerno | G01N 21/0303 356/440 |
| 9,277,206 | B1 * | 3/2016 | Lloyd | G01B 11/2545 |
| 9,453,721 | B2 * | 9/2016 | Akita | G01B 11/24 |
| 10,105,705 | B2 * | 10/2018 | Chen | B01L 3/50857 |
| 2002/0185161 | A1 * | 12/2002 | Furst | B08B 3/02 134/24 |
| 2003/0038950 | A1 * | 2/2003 | Spolaczyk | G01F 23/292 356/624 |
| 2004/0119035 | A1 * | 6/2004 | Kong | G01B 11/2513 250/559.38 |
| 2004/0128102 | A1 * | 7/2004 | Petty | G01S 5/163 702/150 |
| 2005/0181519 | A1 * | 8/2005 | Karg | B01F 3/0865 436/180 |
| 2007/0210240 | A1 * | 9/2007 | Metcalfe | G01B 11/026 250/208.1 |
| 2008/0110756 | A1 * | 5/2008 | Yamazaki | B01D 57/02 204/452 |
| 2009/0181463 | A1 * | 7/2009 | Chen | B01L 3/50857 436/150 |
| 2009/0208175 | A1 * | 8/2009 | Hongo | C03C 25/109 385/125 |
| 2011/0167525 | A1 * | 7/2011 | Humphris | G01B 11/0608 850/33 |
| 2014/0332674 | A1 * | 11/2014 | Goto | G01N 30/74 250/227.11 |
| 2015/0276388 | A1 | 10/2015 | Akita et al. | |
| 2016/0084641 | A1 | 3/2016 | Akita | |

FOREIGN PATENT DOCUMENTS

| EP | 0 540 343 A1 | 5/1993 |
|---|---|---|
| EP | 2 348 331 A1 | 7/2011 |

* cited by examiner

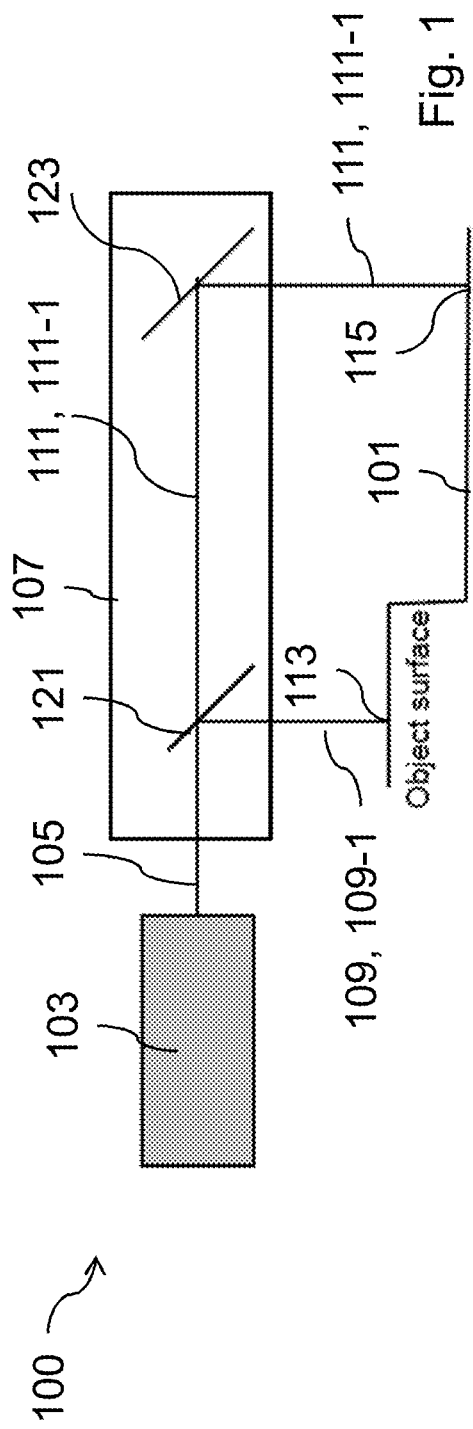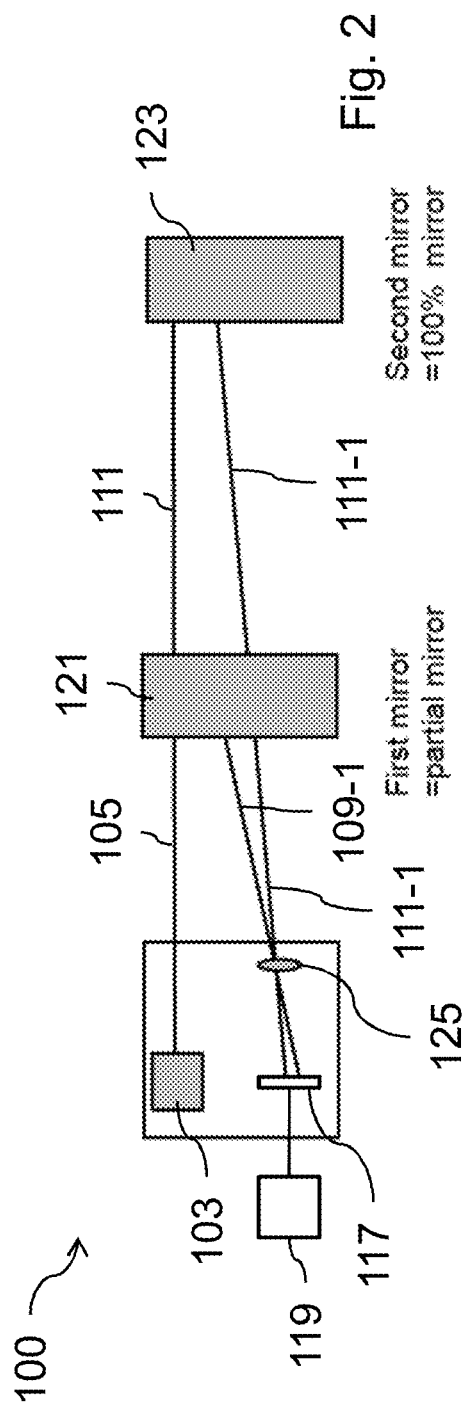

SENSOR DEVICE FOR MEASURING A SURFACE

CROSS REFERENCE TO RELATED APPLICATIONS

This application claims the benefit of priority under 35 U.S.C. § 119 of European Application 16171490.2, filed May 26, 2016, the entire contents of which are incorporated herein by reference.

FIELD OF THE INVENTION

The present invention pertains to a sensor device for measuring a surface.

BACKGROUND OF THE INVENTION

Triangulation sensors, especially laser triangulation sensors, can be used for measuring distances in a contactless manner. However, in this case, usually only the distance of a surface area, onto which a light beam of the triangulation sensor is exactly collimated, can be detected. Differences in height between surface areas, for example, a depth of a tire tread, or transitions such as edges and grooves, cannot thus be directly detected with a triangulation sensor, especially a triangulation sensor with a single light source.

The publication DE 102 12 382 B4 describes a sensor system, in which two separate displacement sensors are used to detect a step height or a thickness of an object.

The publication EP 2348331 A1 describes an optoelectronic sensor for the detection of object edges with at least two light transmitters, which have each a light source and a transmitter optics for the generation of collimated transmitted light beams.

SUMMARY OF THE INVENTION

A basic object of the present invention is to create an efficient device for measuring a surface, especially for detecting a surface profile of a surface.

According to a first aspect, the present invention pertains to a sensor device for measuring a surface, comprising a lighting device for emitting a light beam; an optical device, which is configured to split the light beam into a first partial light beam and a second partial light beam, the optical device being configured to emit the first partial light beam in the direction of a first surface area and to emit the second partial light beam in the direction of a second surface area of the surface; a light sensor, which is configured to receive a reflection of the first partial light beam at the first surface area and a reflection of the second partial light beam at the second surface area; and a processor, which is configured to detect a distance of the first surface area and of the second surface area to the sensor device on the basis of the respective position of the reflection of the first partial light beam and of the reflection of the second partial light beam on the light sensor. As a result, the advantage is achieved that a sensor device can be created, which makes simultaneous distance measurements possible at two different surface areas of a surface and here comprises only one lighting device and one light sensor. Such a sensor device may be especially cost-effective to manufacture and may have compact dimensions, especially compared to a sensor device with two separate light sources and light sensors for both distance measurements, respectively.

The surface areas may be areas on a surface or on a lateral surface of an object, for example, of a tire. The surface may have a uniform or a nonuniform structure, especially a tread. The surface is, for example, a running surface of a tire. The size of the respective surface areas may be fixed by a cross section of the light beam emitted by the lighting device or a cross section of the respective partial light beam.

The sensor device may be a hand-held device for measuring the surface and may be held above the surface or moved over the surface by a user for a measurement.

The sensor device may be configured as a triangulation sensor, especially a laser triangulation sensor, or comprise a triangulation sensor. In this connection, the first partial light beam and the second partial light beam may each be used for measuring the distance, especially for simultaneous measurement of the distance, of two different surface areas to the sensor device.

The processor may be configured as a microprocessor. The processor may comprise an integrated circuit or be configured as an integrated circuit. Further, the processor may be integrated into a data processing unit connected to the sensor device, for example, a desktop computer or a laptop.

According to one embodiment, the optical device is configured to receive the reflection of the first partial light beam at the first surface area and the reflection of the second partial light beam at the second surface area and to guide same in the direction of the light sensor. As a result, the advantage is achieved that the reflections of the respective partial light beams at the surface areas can be efficiently detected by the light sensor. The light sensor does not have to be collimated directly onto the surface for this.

According to one embodiment, the sensor device is movable over the surface, wherein the processor is configured to detect a change over time in the distance of the first surface area to the sensor device and a change over time in the distance of the second surface area to the sensor device, the processor being further configured to determine a rate of motion of the sensor device over the surface on the basis of the changes in distance of the first surface area and of the second surface area to the sensor device. As a result, the advantage is achieved that a motion of the sensor device over the surface can be efficiently detected.

In this connection, the motion can take place such that the partial light beams are guided one after the other over the same or approximately the same surface areas, for example, the same structures of a surface profile. The rate of motion can be determined from the time lag of the detection of the same surface structure with the first partial light beam and the second partial light beam. In this case, the distance of the first partial light beam and of the second partial light beam, or of the first surface area illuminated with the first partial light beam and of the second surface area illuminated with the second partial light beam can also be taken into account.

According to one embodiment, the processor is configured to determine a profile of the surface on the basis of the change in distance of the first surface area and/or of the second surface area to the sensor device, and on the basis of the determined rate of motion of the sensor device. As a result, the advantage is achieved that a profile of a surface can be picked up by a sensor device having a small size and a simple configuration. The surface is, for example, a running surface of a tire, wherein the sensor device can be moved over the running surface obliquely to the rolling direction or along the rolling direction of the tire in order to detect a profile of the running surface along the direction of motion.

According to one embodiment, the optical device comprises a first semi-transparent mirror device, the first semi-transparent mirror device being configured to split the light beam into the first partial light beam and the second partial light beam, the first semi-transparent mirror device being further configured to reflect the first partial light beam in the direction of the first surface area and to reflect the reflection of the first partial light beam at the first surface area in the direction of the light sensor. As a result, the advantage is achieved that the light beam can be efficiently split into the first partial light beam and the second partial light beam. Further, the first partial light beam can be efficiently guided by means of reflections in the direction of the surface area, and the first partial light beam reflected at the surface area can be efficiently guided onto the light sensor. In this case, the light sensor can be arranged on the side of the optical device, as a result of which the sensor device can have more compact dimensions.

According to one embodiment, the first semi-transparent mirror device comprises a beam splitter or a semi-transparent mirror, the beam splitter or semi-transparent mirror being able to be illuminated with the second partial light beam. As a result, the advantage is achieved that an efficient splitting of the light into the first partial light beam and the second partial light beam can take place.

According to one embodiment, the optical device comprises a second mirror device, which is arranged behind the first mirror device, the second mirror device being configured to reflect the second partial light beam after illuminating the first mirror device in the direction of the second surface area and to reflect the reflection of the second partial light beam at the second surface area in the direction of the light sensor. As a result, the advantage is achieved that the second partial light beam can be efficiently guided in the direction of the surface area by means of reflections and the first partial light beam reflected at the surface area can be efficiently guided onto the light sensor. In this case, the light sensor can be arranged on the side of the optical device, as a result of which the sensor device can have more compact dimensions.

The first semi-transparent mirror device and the second mirror device may each be arranged at a distance to one another, the distance of the mirror devices having an effect on the distinguishability of the partial light beams reflected on the light sensor. Thus, the distance of the positions of the reflected partial light beams on the light sensor can be increased by a greater distance of the mirror devices and thus a distinguishability of the two partial light beams can be simplified.

The distance of the first semi-transparent mirror device and the second mirror device may be adjustable. The processor can further take into account the distance of the mirror devices in the determination of the rate of motion of the sensor device.

According to one embodiment, the first semi-transparent mirror device and the second mirror device are configured to reflect the first partial light beam and the second partial light beam parallel or approximately parallel to one another in the direction of the first surface area and of the second surface area, respectively. As a result, the advantage is achieved that both partial light beams can be directed vertically onto the surface and shadowings of the first and/or second partial light beam due to surface structures can be prevented.

According to one embodiment, the second mirror device comprises a mirror or a reflection prism. As a result, the advantage is achieved that the second partial light beam can be efficiently reflected in the direction of the surface and, after reflection at the surface, in the direction of the light sensor. A reflection prism offers, in addition, the advantage that a path length, which is covered by the second partial light beam, can be increased by multiple reflections of the second partial light beam in the reflection prism. Due to the increased path length of the second partial light beam, a distance of the respective points of impact of the first partial light beam and of the second partial light beam on the light sensor can be increased.

According to one embodiment, the light sensor comprises a sensor array, especially a diode array. As a result, the advantage is achieved that the positions of the reflected partial light beams on the sensor array can be efficiently detected.

According to one embodiment, the processor is configured to distinguish the reflection of the first partial light beam and the reflection of the second partial light beam on the basis of the positions of the reflections on the light sensor and/or on the basis of an intensity of the reflections, said intensity being detected by the light sensor. As a result, the advantage is achieved that the respective partial light beams can be efficiently distinguished.

According to one embodiment, the light sensor comprises a lens device, which is configured to generate a focused image of the reflected first partial light beam and of the reflected second partial light beam on the light sensor, especially on the sensor array. As a result, the advantage is achieved that the respective reflections of the first partial light beam and of the second partial light beam can be efficiently detected by the light sensor. In this case, the focusing by the lens device reduces, for example, a diameter of the reflected partial light beams and thus simplifies the detection and distinction of the respective partial light beams.

The lens device may comprise a convergent lens, which is arranged at a fixed distance to the light sensor, especially to the sensor array of the light sensor.

According to one embodiment, the lighting device comprises a laser diode, an LED or a laser. As a result, the advantage is achieved that the light beam can be efficiently generated.

According to one embodiment, the lighting device is configured to emit the light beam as a bundled light beam, especially having a punctiform or a linear cross section. A light beam with a punctiform cross section offers the advantage of an as high as possible energy density and minimal distribution of the reflected partial light beams on the light sensor. A light beam with a linear cross section is, by contrast, less prone to irregularities or contaminations on the surface.

According to one embodiment, the lighting device is configured to emit the light beam in a white light wavelength range, an infrared wavelength range or a UV wavelength range. For example, the lighting device is configured to emit the illumination light with a wavelength of 650 nm. Such a visible illumination light offers the advantage that a user of the sensor device can check the collimation of the partial light beams.

According to one embodiment, the sensor device comprises a housing, the lighting device, the optical device, the light sensor and the processor being incorporated into the housing.

According to one embodiment, the sensor device comprises a display for displaying the determined distances of the surface areas, especially for displaying a surface profile or the surface determined on the basis of the distances of the surface areas. As a result, the advantage is achieved that the measurement result of the sensor device can be displayed directly to the user.

The sensor device may comprise a communication interface, for example, a USB interface, for outputting the detected distances and/or the detected surface profile. The sensor device may further comprise a memory for storing the detected distances and/or the detected surface profile.

The present invention may be embodied in hardware and/or software.

Exemplary embodiments of the present invention are shown in the drawings and are described in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side view of a sensor device for measuring a surface;

FIG. 2 is a top view of the sensor device for measuring a surface; and

DESCRIPTION OF THE PREFERRED EMBODIMENTS

Figure 3:
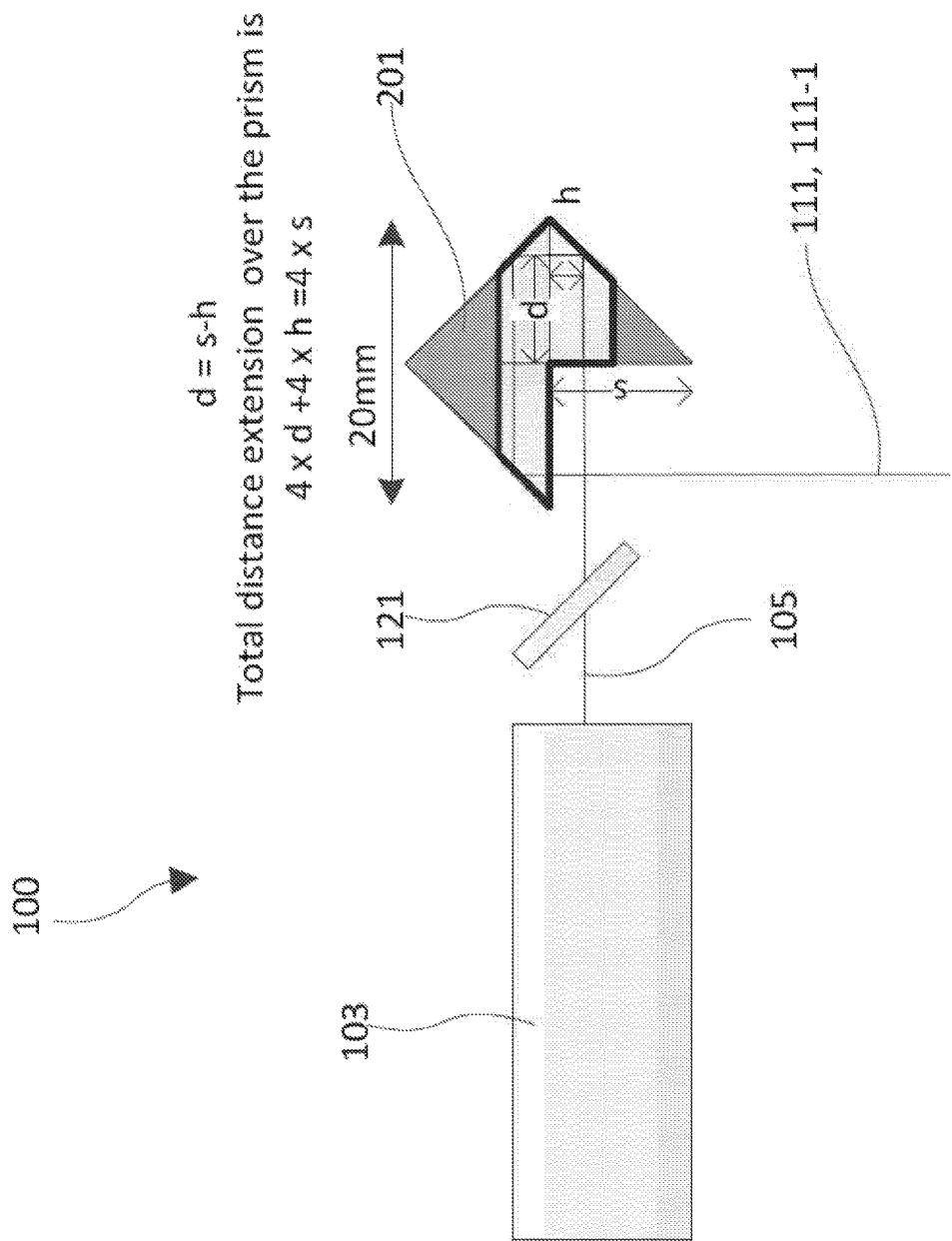
FIG. 3 is a schematic view of a sensor device with a reflection prism.

Referring to the drawings, FIG. 1 shows a lateral view and a top view of a sensor device 100 for measuring a surface 101 according to one embodiment.

The sensor device 100 comprises a lighting device 103 for emitting a light beam 105; an optical device 107, which is configured to split the light beam 105 into a first partial light beam 109 and a second partial light beam 111, the optical device 107 being configured to emit the first partial light beam 109 in the direction of a first surface area 113 of the surface 101 and to emit the second partial light beam 111 in the direction of a second surface area 115 of the surface 101; a light sensor 117, which is configured to receive a reflection 109-1 of the first partial light beam 109 at the first surface area 113 and a reflection 111-1 of the second partial light beam 111 at the second surface area 115; and a processor 119, which is configured to detect a distance of the first surface area 113 and of the second surface area 115 to the sensor device 100 on the basis of the respective position of the reflection 109-1 of the first partial light beam 109 and of the reflection 111-1 of the second partial light beam 111 on the light sensor 117.

The surface areas 113, 115 may be areas on a surface or a lateral surface of an object, for example, of a tire. The surface 101 may have a uniform or a nonuniform structure, especially a tread. The surface 101 is, for example, a running surface of a tire. The size of the respective surface areas 113, 115 can be fixed by a cross section of the light beam 105 emitted by the lighting device 103 or by a cross section of the respective partial light beam 109, 111.

The sensor device 100 may be a hand-held device for measuring the surface 101 and may be held over the surface 101 or be moved over the surface 101 by a user for a measurement.

The sensor device 100 may be configured as a triangulation sensor, especially a laser triangulation sensor, or comprise a triangulation sensor. In this connection, the first partial light beam 109 and the second partial light beam 111 may each be used for measuring the distance, especially for the simultaneous measurement of the distance, of two different surface areas 113, 115 to the sensor device 100.

The processor 119 may be configured as a microprocessor. The processor 119 may comprise an integrated circuit or may be configured as an integrated circuit. Further, the processor 119 may be integrated into a data processing unit connected to the sensor device 100, for example, a desktop computer or a laptop.

The lighting device 103 may comprise a laser diode, an LED or a laser. The lighting device 103 may be configured to emit the light beam 105 as a bundled light beam. In this case, the light beam 105 may have a punctiform or a linear cross section. The lighting device 103 comprises, for example, a collimated laser or a linear laser.

The lighting device 103 may be configured to emit the light beam 105 in a white light wavelength range, an infrared wavelength range or a UV wavelength range. For example, the lighting device 103 is a laser with a wavelength of 650 nm. The light sensor 117 is advantageously configured to detect light in the corresponding wavelength range.

The first semi-transparent mirror device 121 may be configured as a beam splitter or as a semi-transparent mirror for the light beam 105. The first semi-transparent mirror device 121 may be configured to guide, especially to reflect the first partial light beam 109 in the direction of the first surface area 113. In this case, the second partial light beam 111 can be illuminated through (passes through) the first semi-transparent mirror device 121.

In this case, the first semi-transparent mirror device 121 is arranged such that the first semi-transparent mirror device 121 again receives a reflection 109-1 of the first partial light beam 109 at the surface 101 and reflects same in the direction of the light sensor 117. In this case, a position at which this reflected-back first partial light beam 109 hits the light sensor 117 depends, above all, on a distance of the illuminated first surface area 113 to the first semi-transparent mirror device 121 and on a distance of the first semi-transparent mirror device 121 to the light sensor 117. In case of a change in the distance of the illuminated first surface area 113 to the first semi-transparent mirror device 121, for example, an angle, at which the semi-transparent mirror device 121 reflects the reflected first partial light beam 109 on the light sensor 117, is changed.

The processor 119 is configured to detect the distance of the first surface area 113 to the first semi-transparent mirror device 121 or to the optical device 107 on the basis of the position of the reflected first partial light beam 109 on the light sensor 117.

The second mirror device 123 of the optical device 107 is advantageously arranged behind (following with respect to the light beam 105 and the path of the second partial light beam 111) the first mirror device 121. The second mirror device 123 is configured to reflect the second partial light beam 111, after the light beam 105, illuminating the first mirror device 121, is split into the first partial light beam 109 and the second partial light beam 111. The second mirror device 123 reflects the second partial light beam 111 in the direction of the second surface area 115. The second mirror device 123 may be arranged in this case such that the second mirror device 123 receives a reflection 111-1 of the second partial light beam 111 at the second surface area 115. The second mirror device 123 then reflects the reflection 111-1, of the second partial light beam 111 at the second surface area 115, in the direction of the light sensor 117. In this case, the second partial light beam 111 can again penetrate (pass through) the first semi-transparent mirror device 121.

In this case, the position, at which the reflected-back second partial light beam 111 (reflection 111-1) hits the light sensor 117, depends, above all, on the distance of the illuminated second surface area 115 to the second mirror device 123 and on the distance of the second mirror device 123 to the light sensor 117. In particular, the position depends on the length of the beam path of the second partial light beam 111 after reflection at the second surface area 115. In case of a change in the distance of the illuminated second surface area 115 to the second mirror device 123, for example, an angle is changed, at which the second mirror device 123 reflects the reflected second partial light beam 111 on the light sensor 117.

The processor 119 is advantageously configured to detect, analogously to the first partial light beam 109, the distance of the second surface area 113 to the second mirror device 123 or to the optical device 107 on the basis of the position of the reflected second partial light beam 109 on the light sensor 117. In this case, the processor 119 is configured to detect the respective positions of the reflected first partial light beam 109 and of the reflected second partial light beam 111 on the light sensor simultaneously or approximately simultaneously.

The first semi-transparent mirror device 121 and the second mirror device 123 may each be arranged at a distance to one another, wherein the distance of the mirror devices 121, 123 has an effect on a distinguishability of the reflected partial light beams 109, 111 on the light sensor 117. Thus, the distance of the positions of the reflected partial light beams 109, 111 on the light sensor 117 can be increased by a greater distance of the mirror devices 121, 123 and a distinction of the two partial light beams 109, 111 can be simplified.

In the case of a greater path length of the beam path of the reflected second partial light beam 111, which is generated, for example, because of a greater distance between the mirror devices 121, 123, already minor differences between the surface areas 113, 115, especially between a respective height or a distance of the surface areas 113, 115 to the optical device 107, may cause a greater distinction of the positions of the reflected partial light beams 109, 111 on the light sensor 117.

The light sensor 117 may comprise a sensor array, especially a diode array. The sensor array may be configured as a 2D sensor array, which is configured to detect, especially to simultaneously detect, the positions of the respective reflected partial light beams 109, 111.

The light sensor 117 may be configured to detect an intensity and/or a distribution of intensity of the reflected first partial light beam 109 and of the reflected second partial light beam 111. The processor 119 may be configured to distinguish the reflection 109-1 of the first partial light beam 109 and the reflection 111-1 of the second partial light beam 111 on the basis of the positions of the reflections 109-1, 111-1 on the light sensor 117 and/or on the basis of the intensity of the reflections 109-1, 111-1 detected. For example, a first area on the sensor array of the light sensor 117 is associated with the reflected first partial light beam 109 and a second area on the sensor array is associated with the reflected second partial light beam 111.

The light sensor 117 in FIG. 1 further comprises a lens device 125. The lens device 125 may be configured to focus or to image the reflected first partial light beam 109 and the reflected second partial light beam 111 on the light sensor 117. In this case, the focusing by the lens device 125 reduces, for example, a diameter of the reflected partial light beams 109, 111 and thus simplifies the detection and distinction of the respective partial light beams 109, 111.

The lens device 125 may comprise a convergent lens, which is arranged at a fixed distance to the light sensor 117, especially to a sensor array of the light sensor 117.

According to one embodiment, the sensor device 100 is moved over the surface 101 in case of a measurement. The processor 119 is in this case configured to detect a change over time in the detected distance of the first surface area 113 to the sensor device 100 and a change over time in the distance of the second surface area 115 to the sensor device 100. The processor 119 is further configured to determine a rate of motion of the sensor device 100 over the surface 101 on the basis of the detected changes in distance of the first and of the second surface area 113, 115.

In this case, the motion may take place such that the partial light beams 109, 111 are guided one after the other over the same surface areas, for example, the same structures of a surface profile. A rate of motion can be determined from the time lag of the detection of the same surface structure with the first partial light beam 109 and the second partial light beam 111.

The processor 119 is in this case configured to take into account the distance of the first semi-transparent mirror device 121 to the second semi-transparent mirror device 123 and the distance of the two mirror devices 121, 123 to the light sensor 117 in case of the determination of the rate of motion.

The processor 119 may be further configured to determine a surface profile of the surface 101 on the basis of the detected distances or the detected change in distance of the first surface area 113 and/or of the second surface area 115 to the sensor device 100, and on the basis of the determined rate of motion of the sensor device 100.

The surface 101 is, for example, a running surface of a tire, wherein the sensor device 100 can be moved over the running surface obliquely to the rolling direction or along the rolling direction of the tire in order to detect a tread of the running surface along the direction of motion.

FIG. 3 shows a schematic view of a sensor device 100 with a reflection prism 201 according to one embodiment.

The second mirror device 123 is configured as the reflection prism 201 in FIG. 3.

The reflection prism 201 is configured to reflect the second partial light beam 111 in the direction of the second surface area 115 and to reflect the reflection 111-1 of the second partial light beam 111 at the surface 101 in the direction of the light sensor 117.

According to the embodiment of FIG. 3, the path length of the second partial light beam 111 can be increased by multiple reflections in the reflection prism 201. Due to the increased path length, a distance of the respective impact points of the first partial light beam 109 and of the second partial light beam 111 on the light sensor 117 can be increased, without the distance of the second mirror device 123 to the first mirror device 121 having to be increased for this.

The reflection prism 201 in FIG. 3 extends the path length of the second partial light beam 111 by: $4*d+4*h=4*s$, wherein d, s and h are each path lengths, which the second partial light beam 111 covers repeatedly in the reflection prism 201. The precise length of d, s and h depends here on the size and on the precise arrangement of the reflection prism 201 in relation to the second partial light beam 111.

The first semi-transparent mirror device 121 and/or the second mirror device 123 may each be configured to reflect the first partial light beam 109 and the second partial light beam 111 parallel or approximately parallel to one another in the direction of the first and second surface area 113, 115, respectively. In case of measuring a surface 101 with sharply offset recesses, for example, a tire tread, a shadowing of one of the partial light beams 109, 111 in case of vertical orientation of the respective other partial light beam can be prevented by the parallel arrangement of the partial light beams 109, 111.

While specific embodiments of the invention have been shown and described in detail to illustrate the application of the principles of the invention, it will be understood that the invention may be embodied otherwise without departing from such principles.

What is claimed is:

1. A sensor device for measuring a surface, the sensor device comprising:
    a lighting device emitting a light beam;
    an optical device configured to split the light beam into a first partial light beam and a second partial light beam and the optical device being configured to emit the first partial light beam in a direction of a first surface area of the surface and to emit the second partial light beam in a direction of a second surface area of the surface, the optical device emitting the first and second partial light beams in parallel to each other;
    a light sensor configured to receive a reflection of the first partial light beam at the first surface area and to receive a reflection of the second partial light beam at the second surface area; and
    a processor connected to the light sensor and configured to detect a distance of the first surface area and of the second surface area to the sensor device based on a respective position of the received reflection of the first partial light beam on the light sensor and the received reflection of the second partial light beam on the light sensor;
    the optical device including a first semi-transparent mirror device, the first semi-transparent mirror device being configured to divide the light beam into the first partial light beam and the second partial light beam, the first semi-transparent mirror device being configured to reflect the first partial light beam in the direction of the first surface area and to reflect the reflection of the first partial light beam from the first surface area in the direction of the light sensor;
    the first semi-transparent mirror device including a beam splitter or a semi-transparent mirror, the beam splitter or the first semi-transparent mirror being configured and arranged to pass the second partial light beam;
    the optical device including a second mirror device arranged following the first semi-transparent mirror device, the second mirror device being configured to reflect the second partial light beam after passing through the first semi-transparent mirror device in the direction of the second surface area, and to reflect the reflection of the second partial light beam from the second surface area in the direction of the light sensor through the first semi transparent mirror;
    the first semi-transparent mirror device and the second mirror device being configured to reflect the first partial light beam and the second partial light beam parallel to one another in the direction of the first surface area and the second surface area, respectively.

2. A sensor device in accordance with claim 1, wherein the optical device is configured to receive the reflection of the first partial light beam from the first surface area and the reflection of the second partial light beam from the second surface area.

3. A sensor device in accordance with claim 1, wherein:
    the sensor device is movable over the surface;
    the processor is further configured to detect a change over time in the distance of the first surface area to the sensor device and to detect a change over time in the distance of the second surface area to the sensor device; and
    the processor is further configured to determine a rate of motion of the sensor device over the surface based on the detected changes in distance of the first surface area and of the second surface area to the sensor device.

4. A sensor device in accordance with claim 3, wherein the processor is configured to determine a surface profile of the surface based on the detected change in distance of the first surface area to the sensor device or based on the detected change in distance of the second surface area to the sensor device or based on the detected change in distance of the first surface area to the sensor device and based on the detected change in distance of the second surface area to the sensor device and on the basis of the determined rate of motion of the sensor device.

5. A sensor device in accordance with claim 1, wherein the second mirror device comprises a mirror or a reflection prism.

6. A sensor device in accordance with claim 1, wherein the light sensor comprises a sensor array.

7. A sensor device in accordance with claim 6, wherein the sensor array comprises a diode array.

8. A sensor device in accordance with claim 1, wherein the processor is configured to distinguish the reflection of the first partial light beam and the reflection of the second partial light beam based on a position of the reflections on the light sensor or based on an intensity of the reflections detected with the light sensor or based on a position of the reflections on the light sensor and based on an intensity of the reflections detected with the light sensor.

9. A sensor device in accordance with claim 1, wherein the light sensor comprises a lens device configured to generate a focused image of the reflected first partial light beam and of the reflected second partial light beam on the light sensor.

10. A sensor device in accordance with claim 1, wherein the lighting device comprises a laser diode, an LED or a laser.

11. A sensor device in accordance with claim 1, wherein the lighting device is configured to emit the light beam as a bundled light beam.

12. A sensor device in accordance with claim 11, wherein the bundled light beam has a punctiform or a linear cross section.

13. A sensor device in accordance with claim 1, wherein the lighting device is configured to emit the light beam in a white light wavelength range, an infrared wavelength range or a UV wavelength range.

* * * * *